Patented Oct. 31, 1933

1,932,769

UNITED STATES PATENT OFFICE 1,932,769

SOLUBLE COFFEE

Louis G. Copes, Bayonne, Carl H. Haurand, North Plainfield, and Emily Kellogg, East Orange, N. J., assignors to The Best Foods, Inc., New York, N. Y., a corporation of New Jersey No Drawing. Application February 1, 1930
Serial No. 425,706

9 Claims. (Cl. 99—1)

This invention relates to the preparation of a food product and more particularly to an improved process for producing a soluble extract of coffee.

In application Serial No. 397,152, filed October 3, 1929, by Louis G. Copes, there is disclosed a process for preparing a soluble coffee extract. The present invention is an improvement over the process described in that application, by which a product of improved characteristics may be obtained.

When the ground green coffee bean is extracted with cold water and the extract is dehydrated and roasted and the roasted extracted material is dissolved in water to make a coffee beverage, a slight precipitate is formed which gives an undesirable turbidity to the resulting solution. It is an object of the present invention to provide an improved procedure by which a clear solution of coffee extract may be produced. It is a further object of this invention to produce a soluble coffee extract of improved characteristics. Other objects will become apparent.

We have found that by preheating the green coffee, or the extract thereof, to a suitable temperature, considerably lower than the temperature to which coffee is ordinarily roasted, the portion of the material extracted from the green coffee with cold water which causes the turbidity will be rendered insoluble and may be separated from the solution by filtering or some other suitable means. The solution so treated may be evaporated to dryness and roasted. The resulting solid extract will dissolve in water and produce a clear coffee liquid, having the aroma and flavor of the familiar coffee liquid resulting from the ordinary extraction of roasted coffee bean.

As a specific example of a method for accomplishing this improved result, the raw coffee bean is ground to a more or less fine powder and is placed in a suitable percolating apparatus of standard design. The ground green coffee bean is then subjected to the usual percolating procedure whereby boiling water or nearly boiling water is repeatedly filtered through the ground material. The percolation of the water through the ground green coffee is allowed to continue until all the desired material has been extracted from the coffee bean. This extraction may amount to approximately 15% by weight of the raw bean, but the amount extracted will vary with the raw product used and the product desired.

The extract from the percolation should be filtered and evaporated to dryness, preferably in a vacuum, and the anhydrous residue is roasted at a suitable temperature, for example, at between 400 and 450 degrees Fahrenheit, and preferably at about 430 degrees Fahrenheit for about 20 minutes. If a higher or lower temperature is used, it may be preferable to continue the roasting for a lesser or greater period of time, respectively. The roasted extract may then be dissolved in water in the desired proportions to produce a solution suitable for beverage purposes.

It is apparent that many modifications of the above procedure may be used. For instance, the ground green coffee may be boiled in a quantity of water for a time sufficient to render the undesirable materials insoluble, and the resulting extract may be filtered, evaporated and roasted to give a completely soluble coffee product. If desired, the ground green coffee may be extracted with cold or warm water and the extract may be separated from the solid and boiled to coagulate the undesirable matter, after which it is filtered to remove the material coagulated. This solution is then evaporated and the residue is roasted to give a soluble coffee product. A satisfactory result could also be accomplished by exposing the ground green coffee to steam at atmospheric or higher pressures until the ground material is heated sufficiently to render the undesirable material insoluble, after which the desired materials may be extracted with water or some other suitable solvent. The resulting solution may be filtered if necessary and evaporated to dryness, after which the residue may be roasted to give a completely soluble coffee product.

In each of the above procedures, the green coffee should be subjected to a temperature of about 200 degrees Fahrenheit or over, but below the roasting temperature. The temperature should be at least above that reached in making the finished beverage. Where water or steam are used as the heating medium, the desired temperature may be attained by regulating the pressure to which the heating fluid is subjected.

An improved result may also be accomplished by subjecting the green coffee bean or the ground green coffee to dry heat at a temperature of about 200 to 375 degrees Fahrenheit for approximately 5 to 30 minutes. If desired, this preheated material may be subjected to one of the above extraction methods or the extraction method described in the above mentioned copending application.

In treating the green coffee bean with cold water, certain materials are extracted which will be precipitated upon subsequently heating the extract to produce the coffee beverage. By our improved procedure, we subject the green coffee, or the extract therefrom, to a sufficiently elevated temperature to coagulate this material, after which the coagulated material may be separated from the extract by filtering or other suitable means. It is apparent that the precipitation of this objectionable matter may also be accomplished by the addition of certain chemicals or colloidal gums, and that other solvents, such as organic solvents, for instance, alcohol or ether, may be used to extract the desired materials from the green or preheated coffee bean.

Although we have described specific embodiments of our invention, it is not intended thereby to limit it to the particular procedures described, since it is apparent that many modifications of these illustrative examples may be used.

What we claim is:

1. In the preparation of soluble coffee, the steps comprising preheating green coffee bean at a temperature above about 200 degrees Fahrenheit and below the roasting temperature for a sufficient time to render insoluble in water those substances which would be made insoluble by the subsequent evaporation and roasting of the water extract, extracting with water, filtering, dehydrating the extract and roasting the residue.

2. In the preparation of soluble coffee, the steps comprising extracting green coffee bean with water heated to about 200–375 degrees Fahrenheit for a sufficient time to precipitate the extractable material which would be rendered insoluble by the subsequent evaporation and roasting of the water extract, filtering the extract, evaporating and roasting the residue.

3. In the preparation of soluble coffee, the steps comprising extracting green coffee bean by percolating water heated to about 200 to 375 degrees Fahrenheit through the ground material for a sufficient time to coagulate the extractable material which would be rendered insoluble by the subsequent evaporation and roasting of the water extract, filtering and evaporating the extract and roasting the residue.

4. In the preparation of soluble coffee, the steps comprising extracting ground green coffee bean by percolating it with water heated to about 200 to 375 degrees Fahrenheit for a sufficient time to coagulate the extractable material which would be rendered insoluble by the subsequent evaporation and roasting of the water extract, filtering and evaporating the extract under reduced pressure, and roasting the residue at a temperature between 400 to 450 degrees Fahrenheit.

5. In the preparation of soluble coffee, the steps comprising subjecting green coffee bean to dry heat at a temperature between about 200 to 375 degrees Fahrenheit for a sufficient time to render insoluble in water those substances which would be made insoluble by the subsequent evaporation and roasting of the water extract, extracting with water, evaporating the extract and roasting the residue.

6. In the preparation of soluble coffee, the steps comprising extracting ground green coffee beans with water substantially below 200° F., heating the extract to a temperature of about 200 to 375 degrees Fahrenheit for a sufficient time to precipitate the material which would be rendered insoluble by the subsequent evaporation and roasting of the water-extract, filtering and evaporating the solution, and roasting the residue.

7. In the preparation of soluble coffee extract, the steps comprising heating the material which is extractable with water from green coffee bean to above about 200° F. without roasting the material for a sufficient time to coagulate the portion of the material so extractable which would be rendered insoluble by the subsequent evaporation and roasting, using water in the extraction of the material and separating from the extract the ingredients rendered insoluble by the heating, evaporating the clear extract and roasting the residue.

8. In the preparation of soluble coffee, the steps comprising preheating the green coffee bean to a temperature above about 200° F. without roasting, for a sufficient time to render insoluble in water those substances which would be made insoluble by the subsequent evaporation and roasting of the water extract, extracting with water, separating the grounds and insoluble material from the extract, evaporating the extract to dryness and roasting the residue.

9. In the preparation of soluble coffee extract the steps comprising extracting green coffee bean with cold water, heating the extract to about 200° to 375° F. for a sufficient time to precipitate the material which would be rendered insoluble by the subsequent evaporation and roasting of the water extract, separating the precipitate, evaporating the clear extract and roasting the residue.

LOUIS G. COPES.
CARL H. HAURAND.
EMILY KELLOGG.